US008794868B2

(12) United States Patent
Fritz

(10) Patent No.: US 8,794,868 B2
(45) Date of Patent: Aug. 5, 2014

(54) OPTICAL GUIDANCE SYSTEM FOR A LAYING ENGINE FOR PRODUCING A CONCRETE OR ASPHALT TOP LAYER

(75) Inventor: Matthias Fritz, Linz (DE)

(73) Assignee: Leica GeoSystems AG, Heerbrugg (CH)

( * ) Notice: Subject to any disclaimer, the term of this patent is extended or adjusted under 35 U.S.C. 154(b) by 413 days.

(21) Appl. No.: 12/601,058

(22) PCT Filed: Jun. 19, 2008

(86) PCT No.: PCT/EP2008/004922
§ 371 (c)(1),
(2), (4) Date: Dec. 10, 2009

(87) PCT Pub. No.: WO2008/155113
PCT Pub. Date: Dec. 24, 2008

(65) Prior Publication Data
US 2010/0215433 A1 Aug. 26, 2010

(30) Foreign Application Priority Data

Jun. 21, 2007 (EP) ..................................... 07110745

(51) Int. Cl.
*E01C 23/07* (2006.01)
(52) U.S. Cl.
USPC ........................................................ 404/84.5
(58) Field of Classification Search
CPC ..... E01C 19/48; E01C 19/006; E01C 19/004; E01C 23/163; E02F 9/2045
USPC ........................ 404/84.05, 84.2, 84.5; 701/50
See application file for complete search history.

(56) References Cited

U.S. PATENT DOCUMENTS 3,071,049 A * 1/1963 Pizzarotti et al. ................ 404/75
3,604,512 A * 9/1971 Carter et al. .................... 172/4.5
3,774,401 A * 11/1973 Allen ................................ 60/420
5,288,167 A * 2/1994 Gaffard et al. ............. 404/84.05

(Continued)

FOREIGN PATENT DOCUMENTS

DE 93 13 075.9 U1 12/1993
EP 0541417 A1 5/1993

(Continued)

*Primary Examiner* — Abigail A Risic
(74) *Attorney, Agent, or Firm* — Maschoff Brennan

(57) ABSTRACT

The invention relates to an optical guidance system for a laying engine for producing a concrete or asphalt top layer along a given path (6), wherein the laying engine comprises a first unit (1), such as a distributor for distributing the material and a second unit (2), such as a finisher for smoothing the material. The first and second unit are driven independently of each other and may be driven in formation. According to the invention, the optical guidance system comprises at least one transmitter component (3), one receiver component (5) and one computer component (19) for providing control instructions, relating to the direction of travel of the first or second unit. The transmitter component (3) is to be provided on the second unit (2) ad designed to emit optical reference beams (4). The receiver component (5) is to be provided on the first unit (1) and comprises several photosensitive receiver regions for detecting the reference beams and is designed to determine at least one incidence point for the reference beams on the receiver components (5). The computer component (19) calculates control instructions for the first and/or second unit using the at last one incident point and provides the same, for example to an operator, by means of a display or direct to a control unit.

18 Claims, 7 Drawing Sheets

(56) References Cited

U.S. PATENT DOCUMENTS

| | | | |
|---|---|---|---|
| 5,387,853 A * | 2/1995 | Ono | 318/587 |
| 5,572,449 A * | 11/1996 | Tang et al. | 700/304 |
| 5,921,708 A | 7/1999 | Grundl et al. | |
| 6,016,455 A * | 1/2000 | Ohtomo et al. | 701/50 |
| 6,044,312 A | 3/2000 | Sudo et al. | |
| 6,171,018 B1 * | 1/2001 | Ohtomo et al. | 404/84.5 |
| 6,801,305 B2 * | 10/2004 | Stierle et al. | 356/4.01 |
| 2002/0165649 A1 | 11/2002 | Rekow et al. | |
| 2006/0229804 A1 * | 10/2006 | Schmidt et al. | 701/205 |
| 2009/0010712 A1 * | 1/2009 | Kipfer et al. | 404/84.05 |
| 2010/0049374 A1 * | 2/2010 | Ferrin et al. | 701/1 |

FOREIGN PATENT DOCUMENTS

| | | |
|---|---|---|
| EP | 1079029 | 2/2001 |
| EP | 1 708 065 A2 | 10/2006 |
| EP | 1818747 A1 | 8/2007 |
| FR | 2541853 A1 | 9/1984 |
| FR | 2671412 A1 | 7/1992 |

* cited by examiner

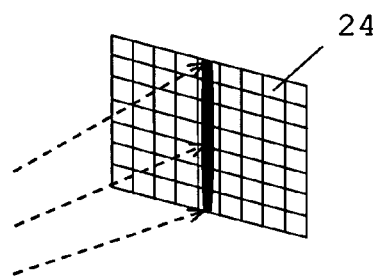
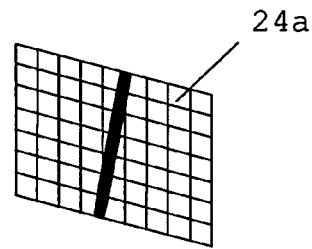
FIGURE 7A　　　　　　　　　FIGURE 7B
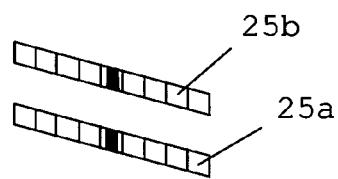
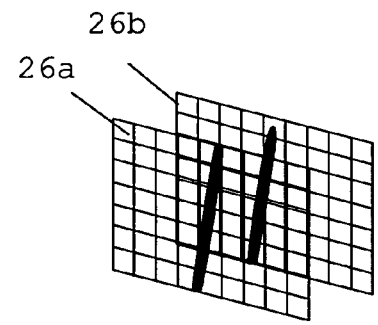
FIGURE 7C　　　　　　　　　FIGURE 7D

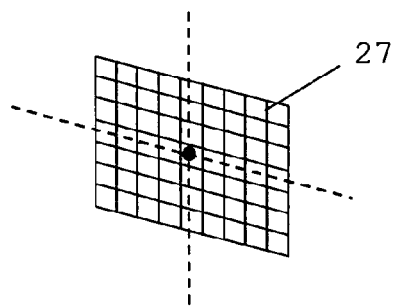
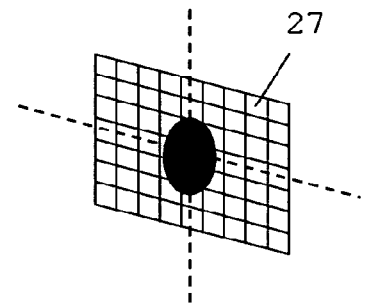
FIGURE 7E
FIGURE 7F
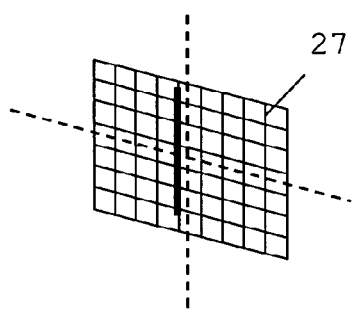
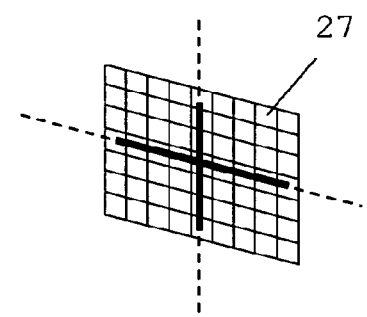
FIGURE 7G
FIGURE 7H

OPTICAL GUIDANCE SYSTEM FOR A LAYING ENGINE FOR PRODUCING A CONCRETE OR ASPHALT TOP LAYER

The invention relates to an optical guidance system for a paving train for producing a surface layer comprising concrete or asphalt material.

BACKGROUND

Two or more units travelling in formation and intended for laying concrete or asphalt material and producing a continuous surface layer having a desired surface profile along a predetermined path are designated as a paving train. Such paving trains are used in particular in the construction of traffic areas, such as in the production and repair of roads and squares. The units used in the paving train are, for example, at least one spreader and at least one finisher—such as a slipform paver or an asphalt paver. Likewise known is the use of two or more finishers in one paving train. The finisher is generally followed by a spray vehicle which sprays chemicals onto the surface which prevent excessively fast drying of the material.

In the paving process, the material to be laid is usually delivered by means of a loader unit, such as a truck or a mixer, and is unloaded along the predetermined path. The spreader is equipped with a distributing member, such as a screw, for distributing material and carries out a transverse distribution and in general also an initial smoothing of the material. The coarse smoothing is effected by means of a drawing device of the spreader in such a way that approximately the desired height of the surface layer is achieved.

Trailing behind the spreader at a predeterminable distance, the finisher then draws the material by means of its characteristic beam, which, for example, may be a screeding beam or may have a profile, so that the desired height of the surface layer is achieved with generic accuracy—in the millimetre range.

For guiding the paving train along the predetermined path and optionally also for vertical positioning of the working parts of the units—such as the paving beam, the drawing device and the distributing member—it is usual to stretch a reference line—e.g. a wire cable—along which guidance takes place. This takes place by means of distance sensors which are linked to the automatic control system of the machines. Units trailing behind the rearmost finisher—such as the spray vehicle—generally do not use the reference line for longitudinal scanning, but the laid surface layer.

As an alternative to reference line scanning, the finisher is controlled via a position or attitude determination system. For example, the position of the finisher is determined via a position element arranged thereon—or a plurality of position elements. This is, for example, a GPS receiver which receives position data from satellites, or a reflector whose position is measured by means of a total station. The position thus determined is compared—for example in a ground model—with a theoretical position, control instructions being derived from the comparison. The control instructions relate to the direction control/steering control of the finisher unit, to the vertical positioning—working height—of the beam and optionally to the horizontal one-dimensional or two-dimensional orientation of the finisher unit and of the beam. The determination of the working height can be effected according to the mounting of the position element from the position thereof or via an additional reference determination.

Such methods and devices for controlling a finisher and/or the working height of the paving beam thereof are described, for example, in EP 1 079 029 A2, the unpublished US patent application with the application Ser. No. 11/071,942 or the unpublished European patent application with the application number 04029963.8.

These position or attitude determination methods for control have been developed for high accuracies with regard to the surface layer to be produced and accordingly require complex components and data processing methods Only the finishers operating with the highest accuracy are therefore controlled in this way. This gives rise to the situation that the finisher is controlled in a highly precise manner via a position or attitude determination system but the remaining units of the paving train still require the less complex but extremely labour-intensive reference line method for control. The reference line method requires measurement and laying out the area to be processed before the beginning of the paving work. This complicated preparation is necessary in spite of alternative control of the finisher—for example only for one spreader.

SUMMARY

It is therefore an object of the invention to eliminate the disadvantage of the prior art and to provide a less complicated solution for controlling the units of a paving train.

According to the invention, an optical guidance system comprising a transmitter component and a receiver component is coordinated with the paving train comprising of at least one first unit, such as a spreader, and at least one second unit, such as a finisher. The transmitter component emits optical reference beams or guide beams which are received by means of the receiver component. The receiver component has a plurality of receiving regions for detecting the reference beams and is formed for determining one or more incidence positions of the reference beams on the receiver component. On the basis of this determined incidence position or these determined incidence positions, a computer component derives control instructions for the first and/or second unit and provides these control instructions.

For this purpose, the transmitter component is formed for indirect or direct fixing on the second component, and the receiver component for indirect or direct fixing on the first unit. In a first embodiment of the invention, the transmitter component is arranged on the second unit in such a way that it concomitantly executes the movements of the second unit and so to speak extrapolates said movements over the optical beams. The reference beams thus transmit the implemented movements of the second unit from the latter to the first unit. The optical beams are pointers or are reference for the direction of travel of the first unit, the horizontal longitudinal and/or transverse inclination thereof or the working height of the working part. The reception of the beam by means of the receiver component arranged on the first unit permits the derivation of corresponding control commands with regard to the direction of travel thereof, horizontal longitudinal and/or transverse inclination and working height of the working part or optionally of the working parts. It is of course also possible to arrange the receiver component indirectly or directly on the second unit, and the transmitter component indirectly or directly on the first unit.

In particular, an attitude of the two units relative to one another is derived by the computer component of the optical guidance system according to the invention from the at least one incidence position of the reference beams on the receiver component. For example, a horizontal orientation of the two units relative to one another, a height of the two units relative to one another, a parallel offset with respect to the direction of travel between the two units, a skew position of the two units relative to one another and/or a distance between the two units in the direction of travel can be derived.

According to the invention, the laser transmitter projecting the reference beams is accordingly not set up on the ground—as is known according to the prior art—but is mounted on one of the two units of the paving train. As a result, relative matching of the two units to one another can be effected in an improved manner. Moreover, no moving up of the transmitter component projecting the reference line on the ground and no complicated installation of a reference line along the entire paving path are required since the paving train so to speak carries along with it the guidance system for matching the units to one another—for example with respect to installation height and/or direction of travel.

In particular, the first unit in the paving train travels ahead of the second unit. It is, for example, a spreader unit which applies the concrete or asphalt as paving material along the predetermined path and carries out transverse distribution of the material. The spreader unit is a spreader formed and equipped in a customary manner, for example with a first working part, such as a screw, for distributing the material and with side forms for distributing material along a predetermined width. In general, such spreaders also have a drawing device—beam—as a further working part for drawing the material so that the material layer is produced approximately in the desired height.

The first unit may also be a finisher unit. Thus, for example in the case of two-layer or multi layer laying of surface layers, two or more finishers travel one behind the other in the paving train.

The second unit is in particular a finisher unit, such as a slipform paver or an asphalt paver, having a beam as a—second—working part. The beam is a customary screeding beam or a beam having a profile. In order to produce material surfaces of different height, the beam of a finisher is adjustable in height. If the beam is rigidly fixed to the frame of the finisher, the height adjustment is generally effected via the chassis—such as tracks or wheels—of the finisher, which are adjustable in height, for example via cylinders. Broad beams which may sag are often also adjustable in the middle via a cylinder which is adjustable in height. In the case of finishers in which the beam is fixed via pivotable supports to the frame, the height adjustment is effected in a known manner via a height adjustment device, such as a hydraulic cylinder.

The control of one of the two units of the paving train—in particular of the finisher—can be effected by a driver who steers the finisher along the predetermined path and makes the corresponding adjustments with regard to the inclination of the finisher and/or of the beam and the installation height of the beam. Advantageously, a position or attitude determination system is used for monitoring the finisher. This may be a GPS system which detects the spatial attitude of the GPS receiver and hence of the finisher by means of a GPS receiver mounted on the finisher. A laser-based system can also be used. For example, the position or attitude of one or more reflectors mounted on the finisher is determined by means of one or more theodolites or total stations positioned on the ground. The absolute position of one unit can be determined via the position determination system—in particular the total station or the GPS—so that a relation of the relative position of the two units to an external coordinate system can be produced on the basis of this absolute position and the attitude of the two units relative to one another—derived by the relative optical guidance system.

Below, the first unit is designated as the spreader and the second unit as the finisher. However, this serves only for simplification and by no means excludes the design of the invention with alternative units travelling in a paving train.

According to the invention, the paving train has the above-mentioned optical guidance system for providing control instructions—in one embodiment for extrapolating the control instructions of the finisher to the spreader. The control instructions can be determined from the detection position on the receiver component. For example, transmitter and receiver components are arranged and adjusted relative to one another in such a way that each point on the receiver component corresponds to a direction and/or height. If the receiver component is not formed as a detector but, for example, as a reflective element, and the transmitter component additionally for receiving reflected radiation, the control instructions can also be determined from the reflected radiation received. For example, the computer component can be formed for providing the data derived from the incidence point on a display so that the control instructions for the first unit are provided for a user. The received beams can then be displayed to an operator, for example on a monitor, it then being possible for the operator to initiate corresponding control manually. For example, a coordinate system in which the receiver component is embedded is shown on the monitor. The received beams or an incidence position of the beams are or is then displayed in the coordinate system. In the context of the invention, derivation and provision of the control instructions by the computer component can therefore also be understood as meaning that the incidence point or the incidence points of the reference beams on the receiver component is or are displayed to a user and said user himself carries out the control manually.

However, control commands or control instructions can also be determined by the computer component directly from the incidence point and can be sent automatically to a control unit of the first unit so that the control instructions can be carried out automatically.

The transmitter component is in the form of a reference beam generator for producing guide beams or reference beams and advantageously comprises one or more laser components for directed emission of laser beams. With optical elements, such as, for example, lenses, the laser beams can be made to diverge so that the transmitter component provides, for example, laser beams made to diverge in a fan-like or circular manner as guide beams. Compared with a collimated laser beam, this facilitates in particular the detection and optionally the evaluation or accuracy of measurement. The transmitter component may also be in the form of a line laser, rotary laser or so-called cross laser. In order to determine the distance and optionally control instructions with regard to the distance between spreader and finisher, the transmitter component comprises a laser rangefinder. The transmitter component may also have a plurality of—optionally alternative—components for the emission of the guide beams. Thus, separate components may be provided for indicating the direction of travel, the one-dimensional or two-dimensional inclination, the working height of working parts and the distance.

However, it is also possible for one component to be formed in such a way that a plurality of instructions can be derived. For example, a direction of travel and a height can be indicated by a cross laser. A line laser can be formed for projecting a horizontal and a perpendicular—so that direction of travel and height can also be represented by the projected lines. The horizontal one- or two-dimensional inclination of the finisher can also be determined by linear projections.

The guide beams or reference beams emitted by the transmitter component are received by the receiver component.

Thus, the relative position and/or relative orientation of transmitter and receiver component is detected and, on the basis of the defined coordination of the components with the finisher and spreader, the relative position and/or relative orientation of the finisher and spreader can also be determined. In the case of reception on photosensitive position-sensitive detection elements, the control instructions for the spreader can be derived from the position of the detected guide beams on the detection elements. In the case of a photodiode as the receiver component, the spreader can be controlled in such a way that the photodiode always receives radiation. For measurement of the distance between finisher and spreader, the receiver components may have a reflective element, preferably a retroreflector.

The receiver component may be formed as an optical detector, such as a photodetector, arrangement of laser sensors, or an image recording device. The receiver component comprises a two-dimensional arrangement of photosensitive regions so that one or more incidence points of the reference beams on the receiver component can be determined. In addition, the probability of losing the guide beam is reduced thereby. For example, CCD, CMOS or PSD sensors can be used. If a surface layer of uniform height is produced on flat ground so that there is no variation in the height, the guide beams are also detectable with high probability, without interruption, by detection elements arranged linearly, in particular perpendicularly to the direction of travel, such as a CCD line array. For applications in which a straight path is produced on flat ground, a guidance system comprising a laser for the emission of a collimated beam and a photodiode for reception of the beam provides sufficient reliability.

The first embodiment of the invention is suitable in particular for applications in which the predetermined path has no pronounced changes in direction. This is generally the case for the customary applications, such as in the case of motorways or airports. The surfaces to be processed generally show no changes or only slight changes in the geometries. The distance at which the finisher travels behind the spreader is in general between 3 m and 30 m. In the case of a small distance, the guide beams are incident on the receiver component even in curves—which have radii in the range from 500 m to 1000 m for applications described above. If the spreader travels a greater distance in front of the finisher—which may be necessary, for example, if too much paving material was delivered—the optical guidance system for the travel path along a straight line functions with generic accuracy. Before a curve, the spreader can slow down its speed of travel so that the distance is reduced and the detection also takes place in the curve.

Frequently, the setting angle of the beam of the finisher is changed before the beginning of the work. If the transmitter component is mounted firmly on the finisher in such a way that it is tilted or adjusted in height by the adjustment, this might lead to incorrect indications with regard to the height. Because the receiver component is mounted displaceably—for example on a rail—a corresponding adaptation can be carried out before the beginning of the work. Of course, the transmitter component may also be adjustable.

The transmitter and receiver component or components are coordinated with the finisher and/or with the spreader. For example, the components are fixed via retaining elements to the frame of the finisher or spreader. The retaining elements may be perpendicular to the plane of the frame of the finisher or spreader. Likewise, mounting can be effected in such a way that the components project laterally beyond the respective frames so that the beam path is not interrupted by, for example, operators on the vehicles. If the working height of the working part of the finisher is to be indicated by the transmitter component, the transmitter component—or at least a component thereof—may also be mounted on the working part. If the working part is fixed to the finisher frame, mounting on the finisher frame is sufficient, it optionally being possible, when deriving the control instructions with respect to the height, to use values from an additional sensor, such as a tilt sensor arranged on the frame, in order to increase the accuracy. In the case of a beam connected via adjusting arms to the finisher, a reference sensor can determine the relative position of the beam and finisher, which is then added to the height indicated on the receiver component. The transmitter component or the receiver component can be mounted on the finisher as close as possible to the chassis so that the system is very sensitively designed and can therefore react rapidly to changes in direction.

In a further embodiment of the invention, the optical guidance system furthermore has a fully automatic memory and computer component. In this embodiment, transmitter or receiver component no longer follows movements of the finisher but are adjusted—continuously—according to calculated control instructions. For determining the setting(s), the position or attitude of the finisher, the distance between finisher and spreader, the position of the spreader derived therefrom and the theoretical position thereof—and optionally theoretical working height and theoretical attitude thereof—with respect to the predetermined path are used for calculating the control instructions.

The spreader can be moved at a predetermined or known distance from the finisher. Maintenance of the distance can be monitored by customary methods—for example by speed measurement. Likewise, a rangefinder can be provided for measuring the distance. The rangefinder is for example, as mentioned above, part of the optical guidance system. The measurement can be effected at intervals adapted to the requirements or circumstances.

A model which represents the predetermined path and the theoretical positions on the ground or along the path of spreader and finisher—required for creating said path—is stored in the memory unit of the guidance system. From the position or attitude of the finisher which is determined on the basis of a position or attitude determination system, said finisher can be controlled with respect to the theoretical values provided by the ground model. The position or attitude information about the finisher is now used further in the computer unit for calculating settings of the transmitter and/or receiver components for providing control instructions with respect to the theoretical values of the spreader. From the known actual position or actual attitude of the finisher and the known relative distance of finisher and spreader, the actual position of the spreader can be derived. The theoretical direction of travel specified at the corresponding actual position of the spreader and optionally the theoretical height of the working part or of the working parts and the theoretical orientation of the spreader can then be taken from the ground model.

These control instructions can be calculated as settings of the transmitter and/or receiver component in the computer component. The transmitter and/or receiver component is then adjusted, preferably automatically, in such a way that the control instructions are provided taking into account the actual position or actual attitude of the finisher. The setting can be effected via an automatic control of the transmitter and/or receiver component, transmitter and/or receiver component being equipped with a control mechanism. With each new calculation, the setting is updated.

BRIEF DESCRIPTION OF THE DRAWINGS

The invention is described in more detail below, purely by way of example, with reference to working examples shown schematically in the drawings. Specifically.

FIG. 7 shows, in eight partial FIGS. 7A to 7H, working examples of a receiver component or of received guide beams.

DETAILED DESCRIPTION

The diagrams in the figures are not to be considered as being to scale. In particular, diagrams of the components of the optical guidance system and position determination components are shown on a larger scale in relation to the units of the paving train.

Figure 1:
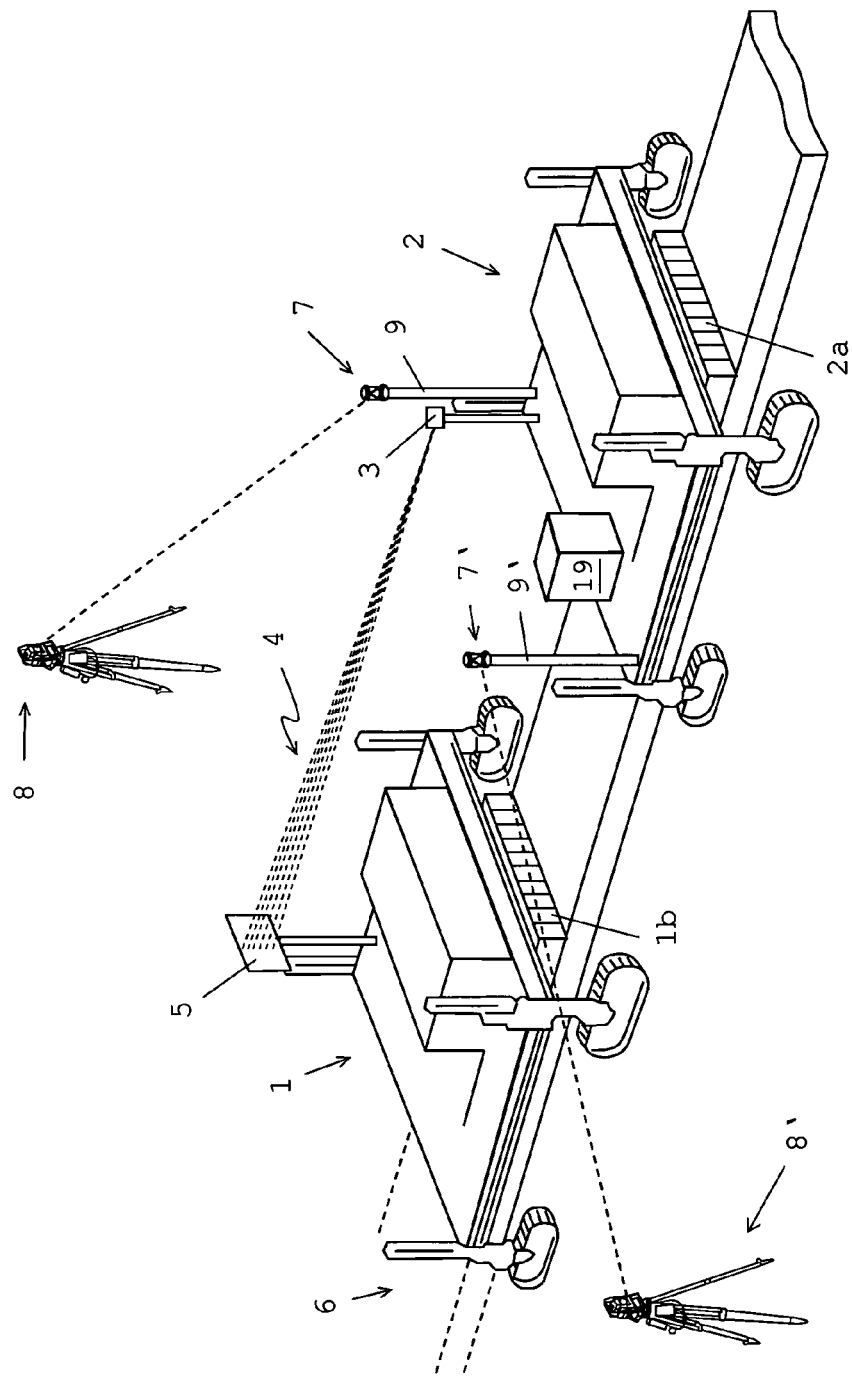
FIG. 1 shows a first and second unit of a paving train comprising a first embodiment of an optical guidance system according to the invention.

FIG. 1 shows a first unit 1 and second unit 2 of a paving train in the working position. The first unit 1 is a spreader and the second unit 2 is a slipform paver having a screeding beam 2a as a second working part. Not shown is a loader unit which delivers the material and applies it before the spreader along the predetermined path 6 to be processed. The loading is effected, for example, conventionally from trucks. In general, spreader and finisher may also have bins for the paving material and a transfer device for transporting material backwards in front of the beam. The first unit 1 of the paving train—the spreader—distributes the material by means of a first working part, not shown in the figure, transversely over the predetermined path 6. The path may be, for example, 16 m wide. With a spreading beam 1b as a further working part, the spreader spreads the material and smoothes it roughly. The slipform paver following the spreader then smoothes the material layer, which, for example, is still a few centimetres too high, by means of the screeding beam 2a so that a predetermined height of the layer is achieved with millimetre accuracy. The slipform paver is then followed, for example, by a spray vehicle—not shown—which feels along the installed material layer.

Since the slipform paver must produce the direction and height of the predetermined path with maximum accuracy, correspondingly precise control thereof is required. In order to control the slipform paver with generic accuracy, two reflectors 7, 7' are firmly mounted as position indicators by means of retaining elements 9, 9' on the slipform paver. By means of two tacheometers 8, 8' arranged on the ground, the position of the reflectors 7, 7' is detected. From this position determination and the known attitude relationship between reflectors 7, 7' and slipform paver, the position thereof can be derived. The derived position is compared with a predetermined theoretical position of the slipform paver and the slipform paver is correspondingly controlled.

Since the screeding beam 2a of the slipform paver is fixed rigidly here to the frame, the vertical position of the beam can also be derived from the position determination. If appropriate, a reference sensor which additionally determines the relative position of the screeding beam 2a and finisher frame is also used for increasing the accuracy.

The slipform paver is controlled with high precision via the reflectors 7, 7' and tacheometers 8, 8' as a position determination system. In order also to control the leading spreader without great effort, an optical guidance system is, according to the invention, coordinated with the paving train. Said system comprises a transmitter component 3 arranged on the slipform paver and intended for emitting optical reference beams 4 and a receiver component 5 arranged on the spreader and intended for receiving the reference beams 4. Here, the transmitter component 3 is in the form of a laser having an optical element for divergence of the laser beam. The laser beam made to diverge in a fan-like manner constitutes the reference beams 4. The transmitter component 3 is fixed on the slipform paver in such a way that the reference beams 4 are emitted in the direction of travel thereof. Movements—such as changes of direction—of the slipform paver are concomitantly executed by the transmitter component 3 and accordingly transmitted by the reference beams 4. By means of the fan-like laser beam shown, the direction of travel and a horizontal inclination transversely to the direction of travel can be transmitted from the rear to the front unit. For this purpose, an incidence position of the reference beams 4 on the receiver component is determined—on the basis of the plurality of receiving regions. This incidence position can now be used by the computer component 19, which can be mounted, for example, on the rear unit, for deriving and providing the control instructions. Depending on requirements, the computer component can, however, also be integrated in other components, such as, for example, a display unit for displaying the control instructions, or in a control unit for automatic control of the front unit of the paving train.

Depending on the arrangement of the individual components of the optical guidance system, information signals—such as, for example, the signals which are produced by the receiving regions of the receiver component and contain the information regarding the incidence position, or the control instruction signals provided by the computer component—can be transmitted via corresponding cable connections or wireless links (for example Bluetooth).

Figure 2:
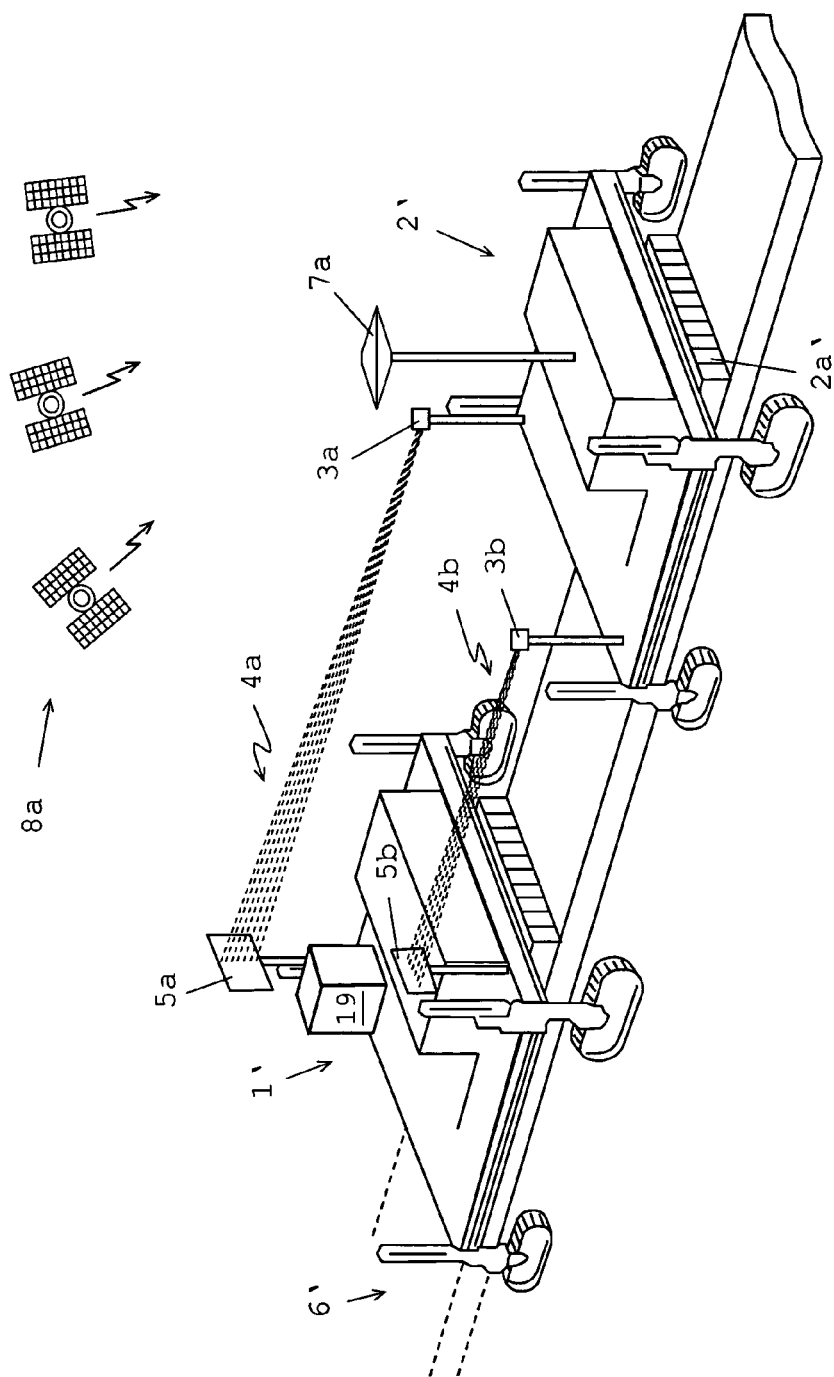
FIG. 2 shows a first and second unit of a paving train comprising a second embodiment of an optical guidance system according to the invention.

FIG. 2 likewise shows a spreader 1' as a first unit and a road finisher 2' as a second unit, which travel in formation for producing a concrete road surface along a predetermined path 6'. Here, the road finisher 2' is alternatively controlled via a GPS system. A GPS receiver 7a arranged as an attitude indicator on the road finisher 2' receives signals from satellites 8a. The spatial attitude of the GPS receiver 7a and hence also the spatial attitude of the road finisher 2' can be determined from the signals received. The optical guidance system of the paving train comprises a first laser transmitter 3a mounted on the road finisher 2' and a second laser transmitter 3b as a transmitter component mounted on the road finisher 2', and a first CCD sensor 5a mounted on the spreader 1' and a second CCD sensor 5b as a receiver component mounted on the spreader 1'. The first laser transmitter 3a emits a fan-like laser beam 4a perpendicular to the path 6' for indicating the direction of travel of the road finisher 2' on the first CCD sensor 5a. The predetermined direction of travel is indicated to the spreader 1' or to an operator on the spreader 1' by the reference beams incident on the first CCD sensor 5a, in particular in order to prevent drifting of the spreader 1' from the predetermined direction of travel. The second laser transmitter 3b emits a likewise fan-like laser beam 4b which is horizontal along the path 6' and intended for indicating the height of the road finisher 2' or the installation height of the beam 2a' thereof. A computer unit 19 which is mounted on the front unit—and which in particular can also be integrated in the receiver component—provides the display data for the user display so that a derived incidence position of the reference beams can be displayed as the control instruction by the user display to an operator.

Figure 3:
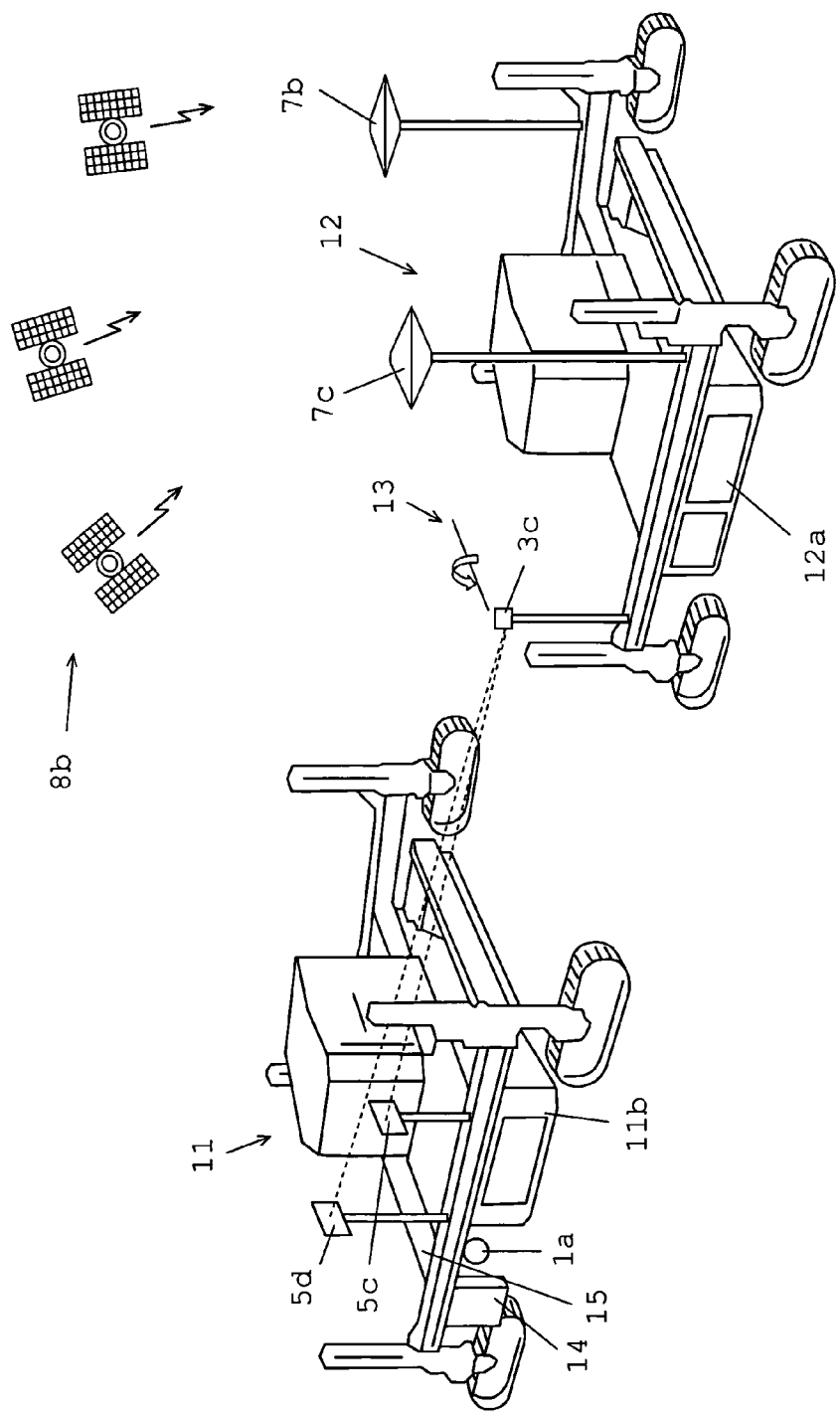
FIG. 3 shows a first and second unit of a paving train comprising a third embodiment of an optical guidance system according to the invention.

FIG. 3 shows a first unit—a spreader 11—and a second unit—a finisher 12—of a paving train with an optical guidance system according to the invention. The optical guidance system comprises a rotary laser 3c as transmitter component and a first area sensor 5c with photosensitive regions and second area sensor 5d with photosensitive regions as receiver component. The rotary laser 3c rotates in the direction of the arrow about the horizontal axis 13 shown. As a result, a guide beam plane substantially perpendicular to the plane of the frame of the finisher 12—and of the spreader 11—is defined by the laser beam. Because two receivers are arranged on the spreader 11, guide beam signals are received at two positions, with the result that the accuracy of the determination of the "extrapolated" direction of travel of the finisher 12 and of the control instructions derived therefrom for the spreader 11 is increased.

Here, the finisher 12 is formed with a variable frame and a beam 12a with variable beam width. The beam is fixed to the longitudinal supports of the frame. The crossbeams of the frame are adjustable in width, for example telescopically extendable. This permits in particular the use of the beam 12a whose width is variable. Two GPS receiver antennas 7b and 7c are arranged in the rear region of the two longitudinal supports. The position of the finisher 12 is determined by satellite signals from GPS satellites 8b—which are shown here in their number and arrangement purely for clearer illustration. Signal processing units can be positioned in a known manner—for example on the finisher 12 or externally.

The spreader 11 is equipped with a screw 1a as a first working part. Transverse distribution of the material to be laid is effected by means of the screw 1a. In order to distribute the material in the desired width, the spreader has a side form 14. In addition, a height form 15 is also provided so that the thickness of the material layer already corresponds approximately to the predetermined value. With the spreading beam 11b as a further working tool, initial rough smoothing of the layer is effected.

Figure 4:
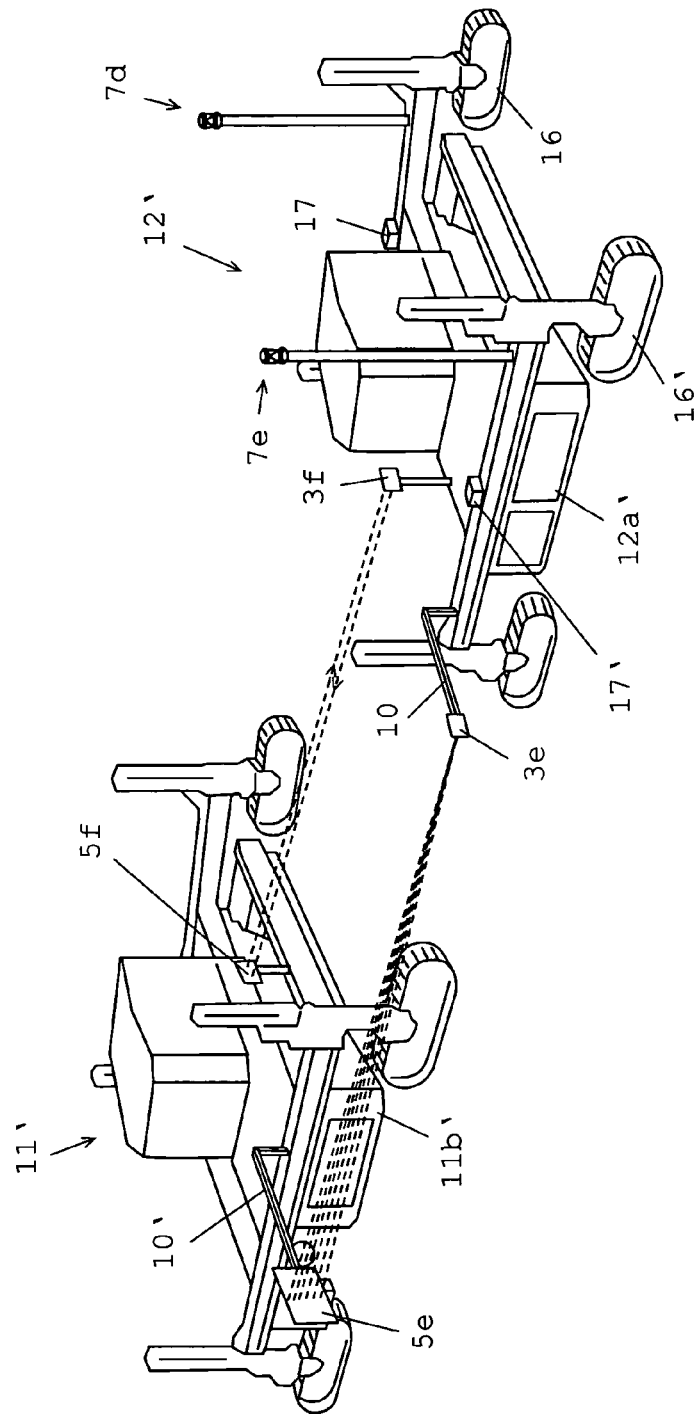
FIG. 4 shows a first and second unit of a paving train comprising a fourth embodiment of an optical guidance system according to the invention.

FIG. 4 shows a finisher 12' comprising a beam 12a' and a spreader 11' with a screw and a spreading beam 11b' according to FIG. 3. The finisher 12' has a first reflector 7d mounted on the right frame longitudinal support and a second reflector 7e mounted on the left frame longitudinal support, which reflectors 7d, 7e represent position indicators. The reflectors 7d, 7e are arranged at the rear end—in the working direction of the finisher 12'—of the frame longitudinal supports and as far as possible at the outer edge of the supports, i.e. as close as possible to the chassis 16, 16'. As a result, high sensitivity of the system is achieved in that changes in position of the finisher 12' are applied to the positions of the reflectors 7d, 7e and the system thus responds to very small changes in the attitude and the height of the finisher 12' or of the beam 12a'. Two tilt sensors 17, 17', one tilt sensor 17 or 17' each on one frame longitudinal support each, are furthermore mounted on the frame. The sensors are fixed in the middle of the frame and measure both the longitudinal tilt and the transverse tilt of the frame or of the finisher 12' or of the beam 12a'. The reflectors 7d, 7e on the finisher 12' are surveyed by a position determination system which is not shown, for example by tacheometers according to FIG. 1. With the information of the position determination system and of the tilt sensors 17, 17', it is possible to calculate points on the finisher 12' by means of which calculation a comparison of the measured actual positions with desired theoretical positions of the points can be carried out and the finisher 12' can be controlled—in particular automatically—in position and orientation. At the same time, the installation height and attitude of the beam 12a' connected to the finisher 12' is controlled thereby.

In order to provide control instructions for the spreader 11', an optical guidance system is provided in a specific arrangement. A laser component 3e emitting a divergent, fan-like beam, as a transmitter component of the guidance system, is mounted via a fixing element 10 on the frame of a finisher 12' as a second unit of a paving train in such a way that the guide beams 4c are emitted laterally adjacent to the finisher. A photosensitive area sensor 5e as a receiver component is mounted in a corresponding manner via a support element 10' on the spreader 11' as a first unit of the paving train. With such an arrangement, interruption of the optical beam path of the guide beams 4c—for example by operators who move on the units—is avoided. In this embodiment, the receiver component of the optical guidance system furthermore comprises a reflective element 5f which is fixed to the rear crossbeam of the finisher frame. A laser rangefinder 3f as part of the transmitter component of the optical guidance system emits laser beams towards the reflective element and receives the reflected beams for distance determination.

Figure 5:
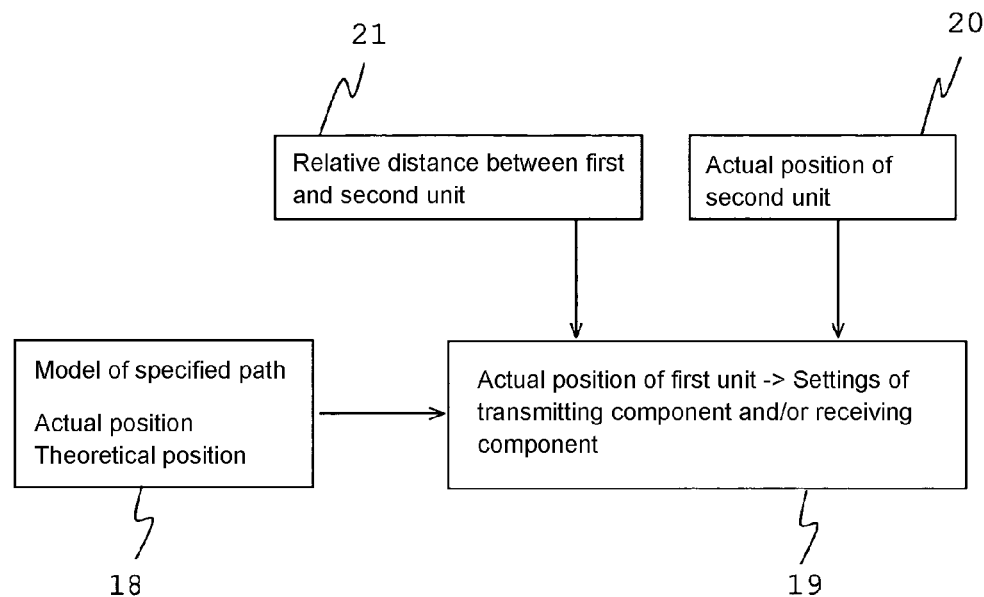
FIG. 5 schematically shows a further embodiment of the invention.

FIG. 5 schematically shows the components of an optical guidance system according to a further embodiment according to the invention. It is assumed that the distance between first and second unit is known. The optical guidance system has a transmitter component and receiver component and furthermore a memory component 18 and a computer component 19. The memory component 18 stores a model which represents the predetermined path along which a concrete or asphalt layer is to be produced, and the theoretical positions of the first unit along the path. If appropriate, further information, such as the actual and theoretical ground and the actual and theoretical positions and orientations of the units and working heights of the working parts, are stored in the model.

The distance value and the information regarding the actual position or actual attitude of the second unit of a position or attitude determination system 20, as shown, for example, in FIGS. 1 to 4, are transmitted to the computer component. The distance value can be transmitted from a laser rangefinder 20 to the computer component 19. Moreover, the distance value can be stored in the memory component 18 and can be read via an interface into the computer component 19. If appropriate, the distance value is also input manually into the computer component 19. In the computer component 19, the actual position of the first unit is calculated from the actual position or actual attitude and the actual distance between first and second unit. This actual position is compared with the corresponding theoretical position from the model. Taking into account the actual position or actual attitude of the second unit and the relative position—for example stored in the computer component 18—of transmitter component and second unit, settings for the transmitter component and/or receiver component are now determined so that control instructions for the first unit can be provided by means of these.

Figure 6:
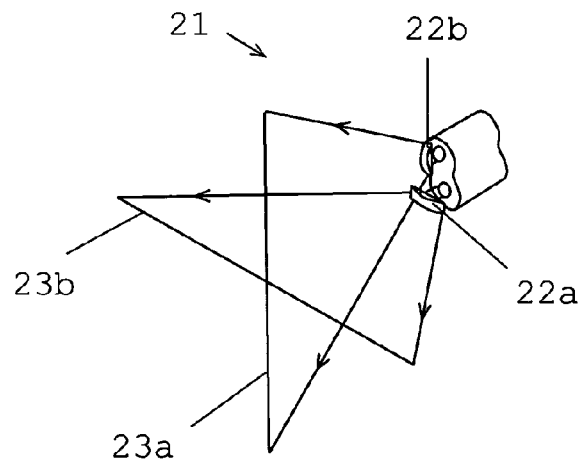
FIG. 6 shows a working example of a transmitter component.

FIG. 6 shows a working example of a transmitter component of an optical guidance system according to the invention. The transmitter component is in the form of a line laser 21 for projection of a vertical line 23a and a horizontal line 23b.

Laser beams emitted by laser collimators are made to diverge by means of cylindrical lenses 22a and 22b so that in each case lines are projected onto a receiver surface.

FIGS. 7A to 7H show working examples of radiation detectors which may form the receiver component or a part thereof, the black areas representing in each case guide beams focused on the respective radiation detector.

In the first working example from FIG. 7A, the radiation detector is in the form of CCD area sensor 24. From the image of a reference signal produced by means of electromagnetic radiation on the CCD area sensor 24, it is evident that the sensor surface is oriented perpendicularly to the central guide beam signal.

In a second working example in FIG. 7B, on the other hand, the guide beam image on the radiation detector in the form of CCD sensor 24a has moved from its central position, i.e. the sensor surface is inclined relative to the reference signal axis. Such an image of the signal is obtained, for example, when the detector or the first or second unit has tilted—in relation to the above statements—transversely to the direction of travel.

FIG. 7C shows the radiation detector in a third working example as an arrangement of two CCD line sensors 25a, 25b. The image of the guide beam signal indicates a correct relative position of radiation detector and guide beam generator.

The fourth working example from FIG. 7D shows a radiation detector in the form of an arrangement of two matrix-like CCD 26a, 26b. The two CCD 26a, 26b are arranged with an intermediate space in two planes. With such a spatial arrangement, both a tilt of the CCD 26a, 26b—and of the first or second unit—transversely to the direction of travel and in the direction of travel can be detected. The magnitude of the tilt can be determined, for example, on the basis of parameters such as light intensity or eccentricity of the position of the image of the CCD 26a, 26b. It is also possible to determine the tilt from a calibration carried out beforehand.

FIGS. 7E to 7H show different images of guide beams on a radiation detector 27 of the receiver component of the optical guidance system. The dashed lines define in each case the zero position or the theoretical position with respect to direction—perpendicular dashed line—and height—horizontal dashed line. FIG. 7E shows the image of a collimated guide beam at the respective zero positions. FIG. 7F shows the image of a circularly divergent guide beam. FIG. 7G shows the projection of a perpendicular line—the line deviates slightly from the zero position; the directional deviation can be corrected by means of a corresponding control instruction. FIG. 7H shows the projection of a perpendicular and a horizontal line which are projected, for example, by means of a line laser corresponding to FIG. 6 as transmitter component; the perpendicular line indicates a correct direction of travel and the horizontal line indicates a correct working height.

I claim:

1. A paving train having an optical guidance system which is configured to produce a surface layer including concrete or asphalt material along a predetermined path, the paving train including at least one first unit including at least one first working part for carrying out a first material processing step and at least one second unit including a second working part adjustable in height for carrying out a second material processing step, the units being driven independently of one another and being capable of travelling in formation, wherein the optical guidance system comprises:

at least two transmitter components provided for mounting on the second unit for transmitting optical reference beams;

at least two receiver components provided for mounting on the first unit including a plurality of photosensitive receiving regions for detecting the reference beams and for determining at least one incidence position of the reference beams on the receiver component; and a computer component for deriving and providing control instructions for the first and/or second unit on the basis of the at least one incidence position in such a way that on the basis of the control instruction and by means of the at least two receiver components and of the at last two transmitter components, the first unit is guided as a function of a movement executed by the transmitter components or the second unit is guided as a function of a movement executed by the receiver components;

wherein the computer component derives, from the at least one incidence position, a relative attitude of the two units with respect to:

a horizontal orientation of the two units relative to one another;

a height of two units relative to one another; and a parallel offset relative to the direction of travel between the two units;

and wherein the optical beam is a pointer for the direction of travel of the first unit, the at least two transmitter components being mounted on the second unit in such a way that it concomitantly executes the movements of the second unit.

2. A paving train according to claim 1, wherein the computer component further derives, from the at least one incidence position, a relative attitude of the two units with respect to:

a skew position of the two units relative to one another; and/or a distance between the two units in the direction of travel.

3. A paving train according to claim 1, wherein the following instructions are derived as the control instructions by the computer component:

instructions relating to the direction of travel of the first and/or second unit;

instructions relating to the horizontal one-dimensional or two-dimensional orientation of the first and/or second unit;

instructions relating to the working height of the first and/ or second working part; and/or instructions relating to the travelling speed of the first and/ or second unit with respect to the distance between the two units.

4. A paving train according to claim 1, wherein the at least one transmitter component includes one of the following components:

laser component for transmitting a collimated laser beam;

laser component for transmitting a laser beam made to diverge in a fan-like manner;

line laser;

laser component for transmitting a circularly divergent laser beam;

rotary laser for producing a reference beam plane; or laser rangefinder.

5. A paving train according to claim 1, wherein the at least one receiver component includes one of the following components:

CCD line sensor or CCD area sensor;

a multiplicity of photodiodes arranged along the line or over an area;

PSD sensor; or

CMOS line sensor or CMOS area sensor.

6. A paving train according to claim 1, wherein the first unit has a further working part which is adjustable in height and intended for carrying out a further material processing step and the computer component is furthermore formed for deriving and providing control instructions relating to the working height of the further working part.

7. A paving train according to claim 1, wherein the first unit has a further working part which is adjustable in height and intended for carrying out a further material processing step of spreading material and the computer component is furthermore formed for deriving and providing control instructions relating to the working height of the further working part.

8. A paving train according to claim 1, wherein the receiver component is adjustable in height on the first unit.

9. A paving train according to claim 1, wherein the receiver component is adjustable in height on a rail on the first unit.

10. A paving train according to claim 1, wherein a position indicator is positioned on the second unit, the absolute position of the indicator being capable of being determined via a position determination system so that a reference of the relative positions of the two units to an external coordinate system can be produced on the basis of the absolute position and the relative attitude derived by the relative optical guidance system of the two units to one another.

11. A paving train according to claim 10, the first unit travelling ahead of the second unit at a predetermined distance, wherein:
 a stored model in the external coordinate system with regard to the surface layer to be finished is provided to the computer component; and
 the computer component determines a respective actual position of the first unit in the external coordinate system on the basis of the absolute position of the position indicator and the derived relative attitude of the two units to one another, and derives the control instructions for the first unit on the basis of a method for comparing the respective actual position with the stored model.

12. A paving train according to claim 1, wherein a position indicator is positioned on the second unit, the absolute position of the indicator being capable of being determined via a total station or GPS so that a reference of the relative positions of the two units to an external coordinate system can be produced on the basis of the absolute position and the relative attitude derived by the relative optical guidance system of the two units to one another.

13. A paving train according to claim 1, wherein the at least one first unit includes the at least one first working part that is adjustable in height for carrying out the first material processing step including distribution of the material and the at least one second unit comprising a second working part that includes a beam for carrying out a second material processing step.

14. A paving train having an optical guidance system according to claim 1, which is configured to produce a surface layer including concrete or asphalt material along a predetermined path, the paving train comprising:
 at least one first unit including at least one first working part for carrying out a first material processing step; and
 at least one second unit comprising a second working part adjustable in height for carrying out a second material processing step, the units being driven independently of one another and being capable of travelling in formation, the at least one transmitter component being carried by the at least one second unit and the at least one receiver component being carried by the at least one first unit; and
 the first unit being guided as a function of a movement executed by the second unit or
 the second unit being guided as a function of a movement executed by the first unit by the control instructions derivable by means of the control component.

15. A paving train having an optical guidance system according to claim 1, which is configured to produce a surface layer including concrete or asphalt material along a predetermined path, the paving train comprising:
 at least one first unit including at least one first working part that is adjustable in height for carrying out a first material processing step including distribution of the material; and
 at least one second unit comprising a second working part adjustable in height and including a beam for carrying out a second material processing step, the units being driven independently of one another and being capable of travelling in formation, the at least one transmitter component being carried by the at least one second unit and the at least one receiver component being carried by the at least one first unit; and the first unit being guided as a function of a movement executed by the second unit; or
 the second unit being guided as a function of a movement executed by the first unit by the control instructions derivable by means of the control component.

16. A paving train according to claim 14, wherein a position indicator is arranged on the second unit, the absolute position of the indicator being capable of being determined via a position determination system—in particular a total station or GPS—so that a reference of the relative positions of the two units to an external coordinate system can be produced on the basis of the absolute position and the relative attitude, derived by the relative optical guidance system, of the two units to one another.

17. A paving train according to claim 14, wherein a position indicator is arranged on the second unit, the absolute position of the indicator being capable of being determined via a total station or GPS so that a reference of the relative positions of the two units to an external coordinate system can be produced on the basis of the absolute position and the relative attitude, derived by the relative optical guidance system, of the two units to one another.

18. A paving train according to claim 11, wherein the optical guidance system is configured to derive and correct skew positions of the two working units relative to one another and the transmitter component includes a laser component for transmitting a laser beam made to diverge in a fan-like manner and/or a line laser and/or a rotary laser for producing a reference beam plane.

* * * * *

UNITED STATES PATENT AND TRADEMARK OFFICE
CERTIFICATE OF CORRECTION

PATENT NO.       : 8,794,868 B2
APPLICATION NO.  : 12/601058
DATED            : August 5, 2014
INVENTOR(S)      : Fritz Page 1 of 1

It is certified that error appears in the above-identified patent and that said Letters Patent is hereby corrected as shown below:

On the title page, item (73), under "Assignee", in Column 1, Line 1, delete "GeoSystems" and insert -- Geosystems --, therefor.

Signed and Sealed this
Thirty-first Day of March, 2015

Michelle K. Lee
*Director of the United States Patent and Trademark Office*